United States Patent
Querejeta Andueza et al.

(10) Patent No.: US 8,783,650 B2
(45) Date of Patent: Jul. 22, 2014

(54) GAS VALVE

(75) Inventors: Félix Querejeta Andueza, Victoria-Gasteiz (ES); Francisco Javier Echenausía Sáez de Zaitegui, Aretxabaleta (ES); José Ignacio Múgica Odriozoal, Bergara (ES)

(73) Assignee: Coprecitec, S.L., Aretxabaleta (ES)

( * ) Notice: Subject to any disclaimer, the term of this patent is extended or adjusted under 35 U.S.C. 154(b) by 322 days.

(21) Appl. No.: 13/392,474

(22) PCT Filed: Jul. 27, 2011

(86) PCT No.: PCT/EP2011/062889
§ 371 (c)(1),
(2), (4) Date: Feb. 24, 2012

(87) PCT Pub. No.: WO2012/025322
PCT Pub. Date: Mar. 1, 2012

(65) Prior Publication Data
US 2012/0273705 A1 Nov. 1, 2012

(30) Foreign Application Priority Data

Aug. 27, 2010 (EP) .................................... 10382239

(51) Int. Cl.
*F16K 31/06* (2006.01)
*H05K 7/14* (2006.01)

(52) U.S. Cl.
USPC ............ 251/129.02; 251/129.04; 251/129.15; 251/129.16; 251/129.17; 251/129.22

(58) Field of Classification Search
USPC ............. 251/129.02, 129.04, 129.16, 129.17, 251/129.22
See application file for complete search history.

(56) References Cited

U.S. PATENT DOCUMENTS

| | | | | |
|---|---|---|---|---|
| 4,705,067 | A | * | 11/1987 | Coffee ........................ 137/487.5 |
| 5,048,564 | A | * | 9/1991 | Gaiardo .................... 137/599.07 |
| 5,144,982 | A | * | 9/1992 | Willbanks ................... 137/625.5 |
| 7,032,879 | B2 | * | 4/2006 | Hayashi ..................... 251/129.09 |

FOREIGN PATENT DOCUMENTS

| | | |
|---|---|---|
| DE | 43 00 309 A1 | 7/1994 |
| EP | 1382907 A1 | 1/2004 |
| FR | 2923893 A1 | 5/2005 |

OTHER PUBLICATIONS

International Search Report (ISR), International Application No. PCT/EP2011/062889, Internatkional Filing Date Jul. 27, 2011, Date of Mailing ISR Oct. 19, 2011, 4 pages.
Written Opinion (WO), International Application No. PCT/EP2011/062889, International Filing Date Jul. 27, 2011, Date of Mailing WO Oct. 19, 2011, 5 pages.
Extended European Search Report (SR), EP Application No. 10382239.1-1252, Date of completion of the SR Feb. 2, 2011.

* cited by examiner

*Primary Examiner* — John Bastianelli
*Assistant Examiner* — Seth W Mackay-Smith
(74) *Attorney, Agent, or Firm* — Tim L. Kitchen; Peter B. Scull; Hamilton, DeSanctis & Cha, LLP

(57) ABSTRACT

A gas valve having a gas enclosure with a gas inlet, a gas outlet and a passage opening situated between the gas inlet and the gas outlet. A valve seat of the valve cooperates with the passage opening to regulate the flow of gas through the valve. An electrical actuator assembly is operatively coupled with the valve seat to regulate the flow of gas through the valve. In one implementation the gas enclosure is at least in part sealed by an elastic sealing member that is pressed upon by a printed circuit board that electrically connects the actuator assembly to an exterior of the gas valve.

19 Claims, 6 Drawing Sheets

GAS VALVE

CROSS-REFERENCE TO RELATED APPLICATIONS

This application relates to and claims the benefit and priority to International Application No. PCT/EP2011/062889 filed Jul. 27, 2011, which claims the benefit and priority to European Patent Application No. EP10382239.1 filed Aug. 27, 2010. Both applications are hereby incorporated by reference in their entirety as if fully set forth herein.

TECHNICAL FIELD

This invention relates to gas valves.

BACKGROUND

Gas valves are generally used to control or regulate the flow of gas reaching a burner (or another device of this type), the flame generated in said burner thereby being regulated. The regulation can mean to regulate the amount of gas flow reaching the burner (regulation valves), or even to allow or not the passage of a gas flow towards said burner (ON/OFF-type valves). Said valves comprise a gas inlet through which they receive the gas coming from a gas source for example, a gas outlet through which the regulated gas flow exits towards the burner, a passage opening that communicates the inlet with the outlet, a valve seat that cooperates with the passage opening to regulate (or allow and/or prevent) the gas flow, the outlet gas flow to said burner thereby being regulated, and internal means accessible from the exterior.

The internal means can comprise at least one sensor or actuation means for example. The sensor can be a temperature sensor for example, and can provide the detected temperature to the exterior of the valve. The actuation means exerts a force on the valve seat to move it and thus causes it to cooperate with the passage opening when power is supplied to it. As a result, power must be supplied to the actuation means to regulate the gas flow, and generally the supply comes from the exterior of the valve.

Such a valve must comprise a connection to the exterior, through which the actuation means can be supplied from the exterior and/or through which the sensor provide the detected temperature, for example.

Document EP1382907A1 discloses a gas valve comprising internal means connected to the exterior, and connections that run out to the exterior to communicate or connect the internal means with the exterior. In this case the internal means comprise actuation means, said actuation means corresponding with electromagnetic means.

SUMMARY OF THE DISCLOSURE

The gas valve of the invention comprises a gas enclosure with an inlet, an outlet and a passage opening to communicate the outlet with the inlet, a valve body that comprises an attached valve seat that cooperates with the passage opening to regulate (or allow or prevent) the gas flow, internal means connected to the exterior of the valve, connection means to communicate or connect the internal means to the exterior of the valve, and elastic means to close the gas enclosure in a sealed manner from the exterior of the valve with the exception of the inlet and the outlet.

The valve also comprises a metal printed circuit board that presses the elastic means towards the inside of the gas enclosure, the printed circuit board being connected to the internal means and said printed circuit board comprising a connection area that comprises, at least partially, the connection means and which is accessible from the exterior, the internal means being communicated or connected to the exterior through said connection area.

As a result, the interior of the valve can be communicated or connected to the exterior in a simple and safe manner while the elastic means are pressed at all times by a metal material, a sealed closure of the valve being also provided.

These and other advantages and characteristics of the invention will be made evident in the light of the drawings and the detailed description thereof.

DETAILED DESCRIPTION

Figure 2:
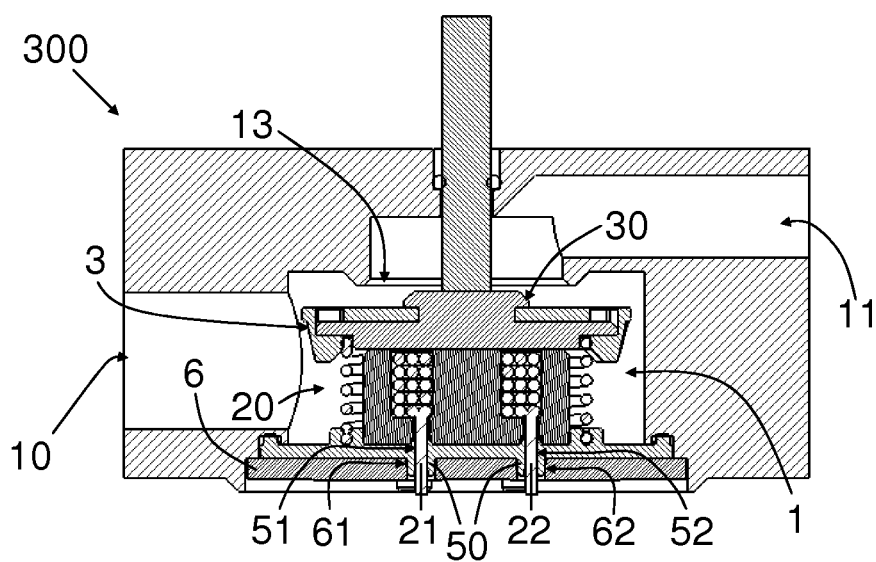
FIG. 2 is a cross-sectional view of the valve of FIG. 1, showing the inlet and outlet of said valve.

A gas valve 300 according to the invention comprises a gas enclosure 1 with a gas inlet 10, a gas outlet 11, and a passage opening 13 to communicate the outlet 11 with the inlet 10, as it is shown in the embodiment of the FIG. 2 for example.

A valve 300 according to the invention also comprises in its interior a valve member 3 that comprises an attached valve seat 30 which cooperates with the passage opening 13 to allow or prevent the gas flow from reaching the outlet 11, and which cooperates with said passage opening 13 to regulate the gas flow that reaches the outlet 11, and internal means communicated or connected to the exterior of the valve 300. The valve 300 can act as an ON/OFF valve, allowing the flow entering through the inlet 10 to reach the outlet 11 or preventing it, or as a regulation valve, where the valve seat 30 can close the passage opening 13 completely or only partially, thereby regulating the gas flow that reaches the outlet 11.

The gas enclosure 1, without taking into account the inlet 10 and the outlet 11, is closed in a sealed manner with respect of the exterior by means of elastic means 5, in those areas where a connection with the exterior or even with another body of the valve 300 is required.

A valve 300 according to the invention also comprises a metal printed circuit board 6, preferably made of aluminium, which presses the elastic means 5 towards the gas enclosure 1 allowing said elastic means 5 to provide a sealed and safe closure of the gas enclosure 1. The printed circuit board 6 is connected to the internal means and comprises a connection area 60 that comprises, at least partially, the connection means, the internal means being communicated or connected to the exterior through said connection area 60. The connection area 60 preferably corresponds with an extension of the printed circuit board 6, and is preferably adapted to receive a connector (not shown in the figures), it thereby being possible to connect the interior of the valve 300 with the exterior in a very simple manner. Said printed circuit board 6 is connected to the internal means by means of at least one connection fixed at one end to said internal means and at the other end to the printed circuit board 6, the connection means corresponding with one track that extend from the connection area 60 of said printed circuit board 6 to the point where the connection is connected to the printed circuit board 6, the track being connected to a corresponding connection.

Figure 1:
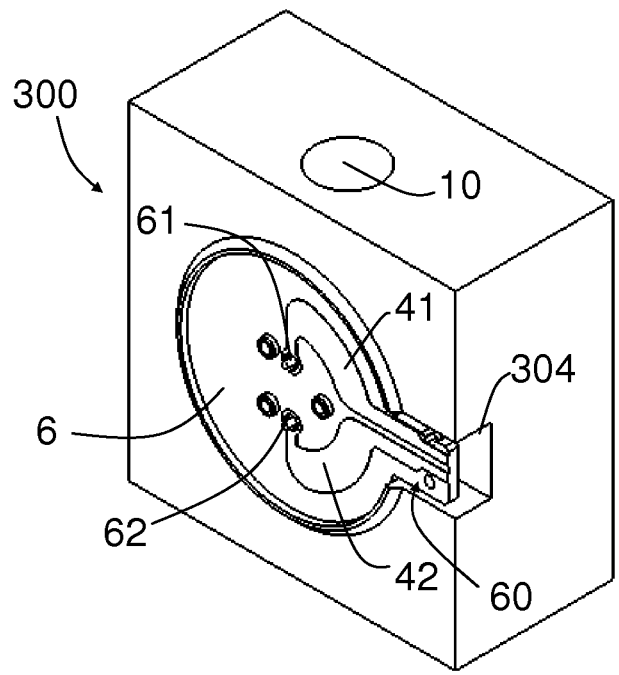
FIG. 1 is a perspective view of a first embodiment of a valve according to the invention.
Figure 3:
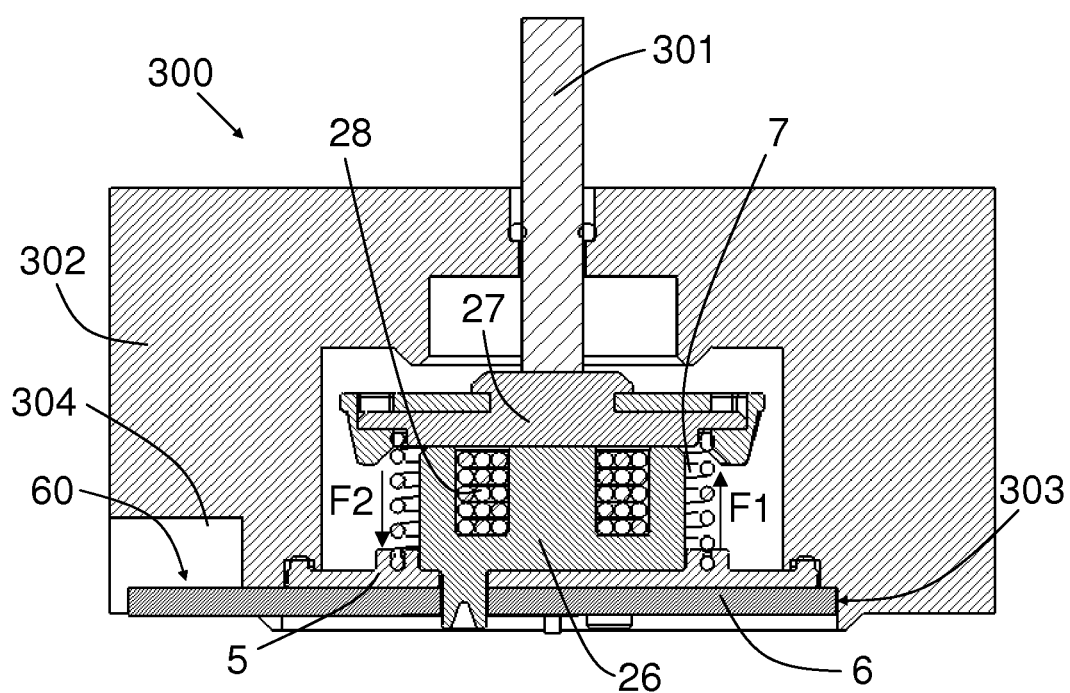
FIG. 3 is a cross-sectional view of the valve of FIG. 1, showing a connection area of a printed circuit board of said valve.
Figure 4:
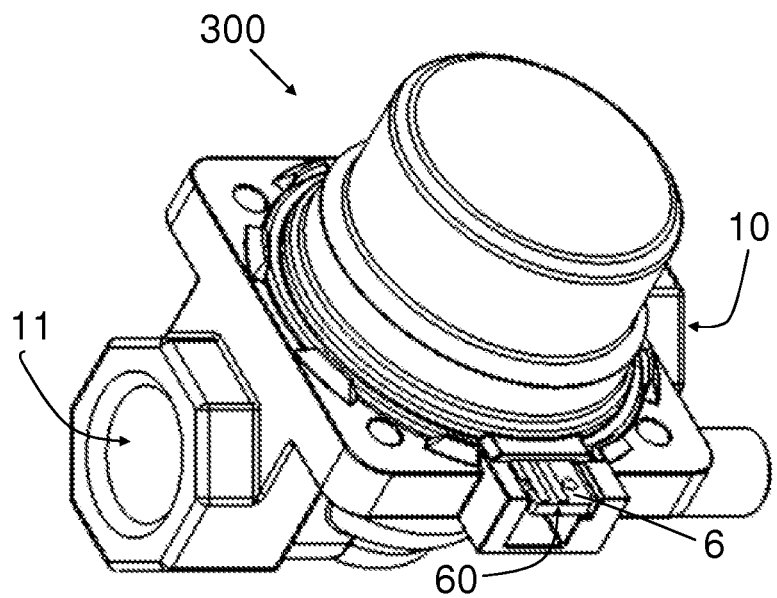
FIG. 4 is a perspective view of a second embodiment of a valve according to the invention.
Figure 5:
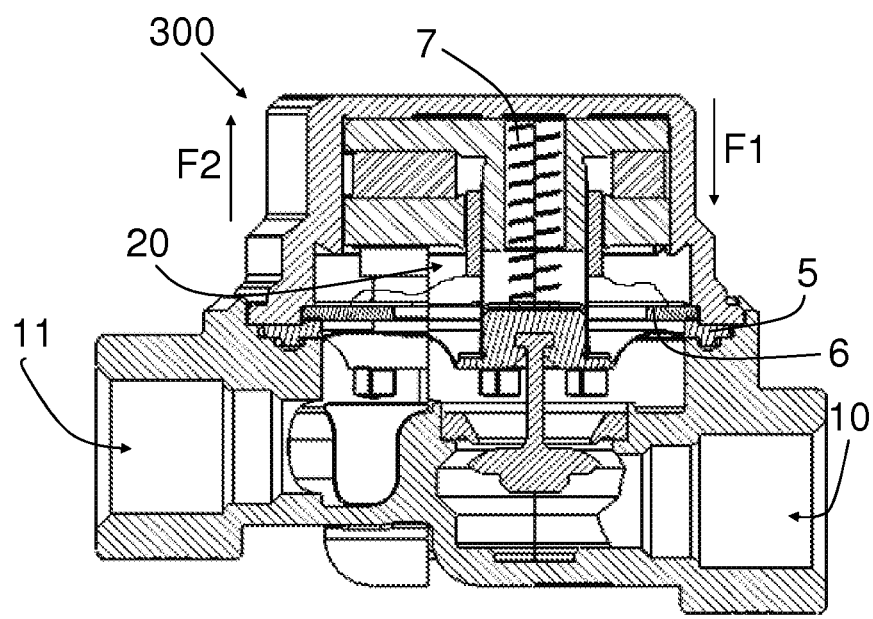
FIG. 5 is a cross-sectional view of the valve of FIG. 4, showing the inlet and the outlet of said valve.

In a first embodiment shown in FIGS. 1 to 3 the valve 300 acts as a regulation valve, and in a second embodiment shown in FIGS. 4 to 7 the valve 300 acts as an ON/OFF-type valve. In both embodiments the internal means comprise actuation means 20 that act on the valve member 3 so that the valve seat 30 cooperates with the passage opening 13, and the actuation means 20 are supplied from the exterior of the valve 300 through the connection means. The actuation means 20 can be electromagnetic as shown in the figures, preferably comprising in this case a static permanent magnet 26, a moving part 27, and a coil 28 wound in the moving part 27, the moving part 27 being connected to the valve seat 30 of the valve member 3. By means of the connection means a supply is provided to the coil 28, said coil 28 being supplied when said actuation means 20 are supplied. When the coil 28 is supplied a magnetic field is generated between said coil 28 and the permanent magnet 26, which creates a regulation force F2, thereby causing the movement of the moving part 27 when said regulation force F2 exceeds an opposite maintenance force F1 exerted by closure means 7 of the valve 300, the valve seat 30 being moved in conjunction with said moving part 27. The closure means 7 comprise a spring and in the absence of supply to the actuation means 20 cause the valve seat 30 to close the passage opening 13 completely. In the second embodiment, depending on the value of the supply current applied to the coil 28, the movement of said valve seat 30 can be regulated, thereby enabling the outlet gas flow of the valve 300 to be regulated. The actuation means 20 can also comprise a linear displacement device, a step motor or an electronic multiple-connection device that can be used to regulate the gas, not shown in the figures.

In the first and second embodiments, the printed circuit board 6 is connected to the actuation means 20 by means of two connections 21 and 22 fixed at one end to said actuation means 20 (to the coil 28) and at the other end to the printed circuit board 6, the connection means corresponding with two tracks 41 and 42 that extend from the connection area 60 of said printed circuit board 6 to the point where the connections 21 and 22 are connected to the printed circuit board 6, each track 41 and 42 being connected to a corresponding connection 21 and 22. In order to avoid possible short-circuits, the tracks 41 and 42 are covered with an electric insulating material.

In the first embodiment the valve 300 also comprises an actuator 301 that is operated externally and which preferably comprises a switch. Said actuator 301, when operated, presses on the valve seat 30, moving it against the force exerted by the closure means 7, thereby opening the passage opening 13. By applying a supply to the actuation means 20 said passage opening 13 is kept open, and in the absence of said supply, the closure force F1 imposes itself and the closure means 7 cause the closure of said passage opening 13 (provided that the actuator 301 is not being operated externally).

The internal means of a valve 300 according to the invention can be housed in the gas enclosure 1, as occurs in the first embodiment for example. The elastic means 5 comprises a hole 51,52 for each connection, the connection passing through said hole to connect to the printed circuit board 6. The printed circuit board 6 can comprise a respective hole 61,62 for each connection, the connection passing through said hole after passing through the respective hole of the elastic means 5. Said connection is connected to the face of the printed circuit board 6 opposite the face that presses on the elastic means 5, and correspond with one pins (or wire), preferably made of copper, the track being formed on said face opposite the face that presses on said elastic means 5. To ensure the gas enclosure 1 is sealed, the elastic means 5 comprise an extension 50 for each hole of the printed circuit board 6, which passes through the corresponding hole, so that said elastic means 5 surround the connection as it passes through the hole of the printed circuit board 6. The connection could also be directly connected to the face of the printed circuit board 6 that presses on the elastic means 5 and preferably correspond with one copper wire, the track being formed on said face.

Thanks to the use of a metal printed circuit board 6, the elastic means 5 is pressed by metal materials, and, in addition, the internal means can be connected to the exterior in a simple manner without this affecting the sealed nature of the gas enclosure 1. Said internal means can also be positioned in said gas enclosure 1, so that the size of an ON/OFF-type valve may be reduced considerably in comparison to the prior art. In addition, when the internal means is disposed in the gas enclosure 1 no type of seal is required between said gas enclosure 1 and a possible air enclosure 2 to house said internal means, as the existence of said air enclosure 2 is not necessary.

When the internal means is disposed in the gas enclosure 1, the valve 300 comprises a body 302, and the body 302 can comprise a housing 303 for housing the printed circuit board 6. Said printed circuit board 6 is fixed to the body 302 by rivets, for example, or other equivalent connection means. The body 302 also preferably comprises an additional housing 304 in the area of the connection area 60, adapted to enable the insertion of a connector, for example, which also serves to protect said connection area 60.

A valve 300 according to the invention can also comprise an air enclosure 2 where the internal means are disposed, as occurs in the second embodiment for example. The valve 300 comprises a first body 100 that comprises the gas enclosure 1, and a second body 200 that comprises the air enclosure 2 and which is connected to the first body 100, the internal means being housed in the air enclosure 2 and the elastic means 5 being disposed between said air enclosure 2 and the gas enclosure 1, said gas enclosure 1 being closed in a sealed manner in relation to said air enclosure 2. The printed circuit board 6 is disposed in the air enclosure 2, and the second body 200 comprises an inner perimeter wall 29 that presses on a face of the printed circuit board 6, preferably on an outer edge of said printed circuit board 6, so that said printed circuit board 6, as well as being held in place, is exerting pressure against the elastic means 5 with the opposite face. In said second embodiment the elastic means 5 preferably comprise a membrane. The required connections are directly connected to the face of the printed circuit board 6 opposite to the one exerting pressure on the elastic means 5, and preferably each one comprise a wire (which can be covered with an insulating material). The required tracks are formed on said face of the printed circuit board 6 opposite to the one exerting pressure on said elastic means 5. The first body 100 preferably comprises a projection 15 to protect the connection area 60, which can also serve as a support for said connection area 60, also providing rigidity to said connection area 60.

Figure 6:
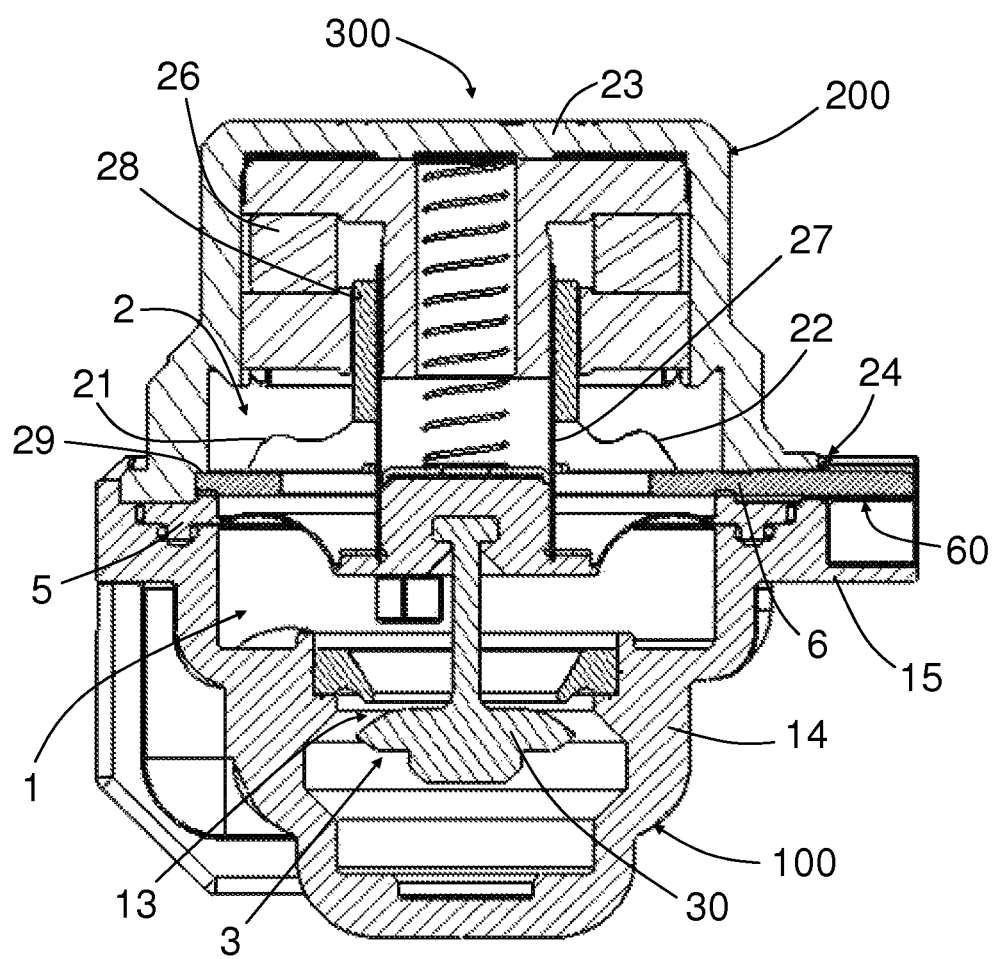
FIG. 6 is a cross-sectional view of the valve of FIG. 4, showing a connection area of a printed circuit board of said valve.
Figure 7:
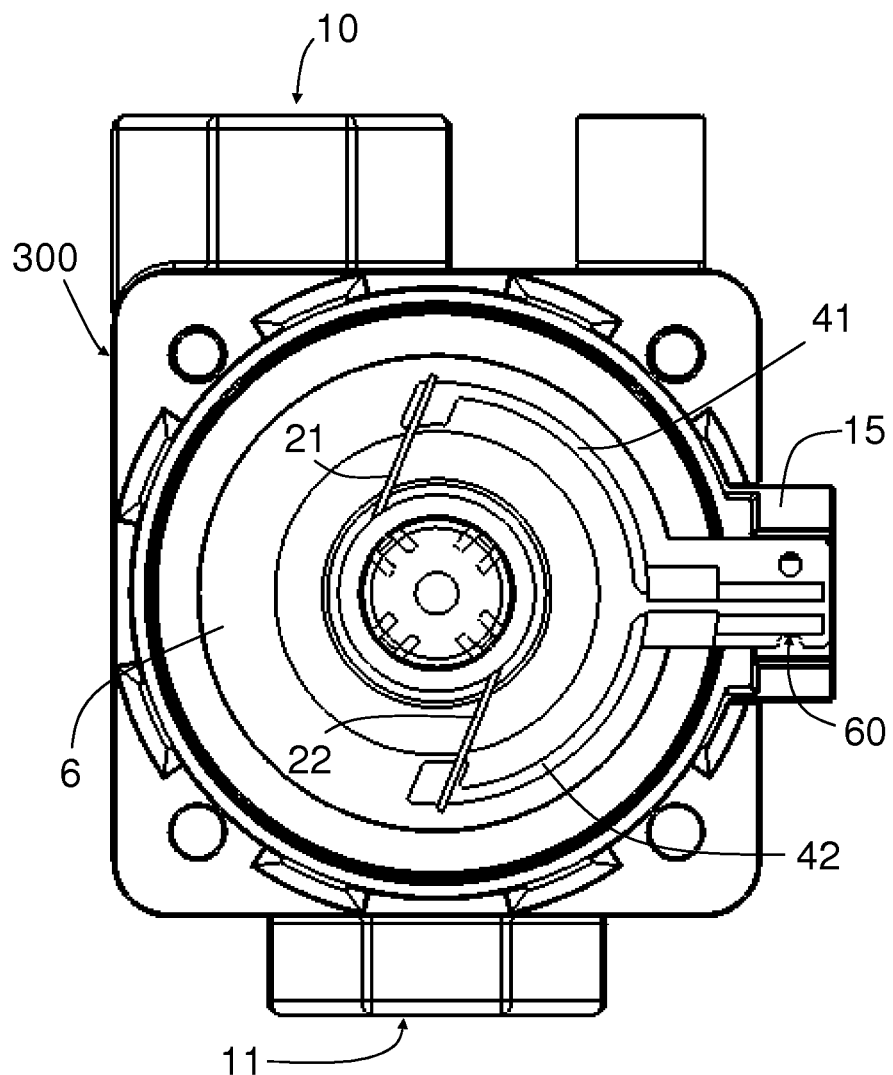
FIG. 7 is a ground view of the valve of FIG. 4, without the second body of said valve.

When the internal means is disposed in the air enclosure 2 the second body 200 comprises a metal structure 23 that is directly connected to a metal structure 14 of the first body 100, the metal structure 23 of the second body 200 comprising a window 24 through which the connection area 60 of the printed circuit board 6 extends so that it can be accessed from the exterior. Said metal structure 23 also comprises an inner perimeter recess that makes the inner wall 29 possible. Thanks to the recess the metal structure 23 can press the printed circuit board 6 against the inner wall 29, the elastic means 5 against a contact surface, as shown in FIG. 6, and can even be supported on the metal structure 14 of the body 100, also against said contact surface, thereby providing a sealed and safe closure between both bodies 100 and 200. The elastic means 5 is thus pressed by metal means: the metal printed circuit board 6 and the metal structures 14 and 23. Said metal structures 14 and 23 are preferably made of aluminium.

When the internal means is disposed in the air enclosure 2, all that presses on the elastic means 5 can be the metal printed circuit board 6, the metal structures 14 and 23 being capable of being connected together to connect the bodies 100 and 200 directly or by means of said printed circuit board 6, although in whichever case the second structure 23 also presses on the printed circuit board 6 in order to hold it in place.

When the internal means comprise actuation means, through the connection area 60 of the printed circuit board 6 can arrive the supply for the actuation means 20 and other additional signals (and/or can also exit other additional signals), such as control signals in the event that the actuation means 20 comprise a step motor, for example. In this case the printed circuit board 6 comprises additional tracks that reach the step motor (or the electronic multiple-connection device) or the point where said motor is connected to said printed circuit board 6 by means of wires, pins or another type of connection.

In a valve 300 according to the invention the internal means can comprise at least one sensor disposed in the gas enclosure 1 or in the air enclosure 2 if any in addition to the actuating means, said sensor being reached by the requiring signals through the connection area 60 of the printed circuit board 6 and/or the signals generated by it being projected outwards through said connection area 60. In this case the printed circuit board 6 comprises additional tracks that reach the sensor or the point where said sensor is connected to said printed circuit board 6 by means of wires, pins or another type of connection. The internal means can also comprise at least one sensor and actuation means 20, case in which, preferably, the actuation means 20 and the sensor are disposed in the same enclosure 1 or 2. In a valve 300 according to the invention the internal means can also comprise at least one sensor without comprising any actuating means.

Figure 8:
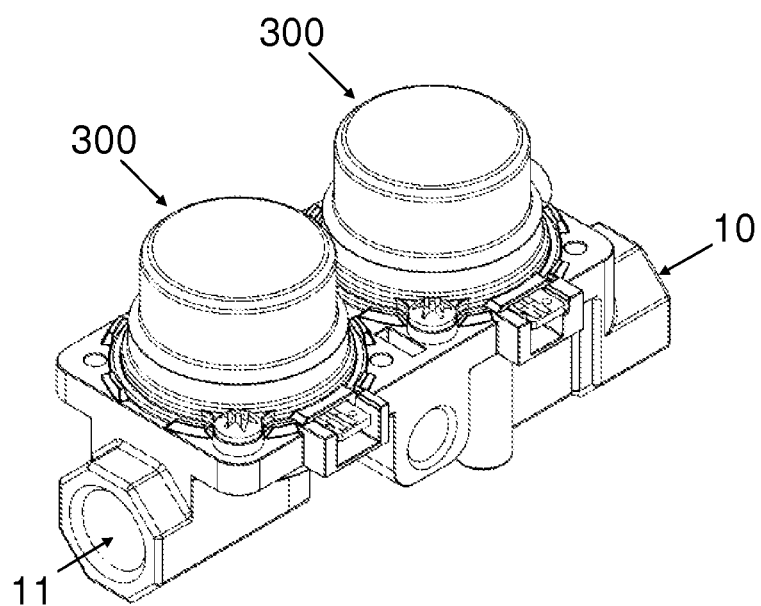
FIG. 8 shows a valve assembly, comprising two valves of FIG. 1 or FIG. 2 joined in series.

A valve assembly can comprise a valve 300, or even two valves 300 connected in series, as it is shown as an example in FIG. 8. In this case, the first valve 300 comprises the gas inlet 10 and the second valve 300 comprises the gas outlet 11, the valve assembly comprising a communication passage, not shown in the figures, between the first valve 300 and the second valve 300. Different configurations for both valves 300 are possible. In one configuration, for example, the first valve 300 acts as a regulation valve and regulates the amount of gas that flows towards the second valve 300, and said second valve 300 acts as an ON/OFF valve allowing or not the flow of gas towards the gas outlet 11. In another configuration, for example, the first valve 300 acts as an ON/OFF valve and allows or not the gas to flow towards the second valve 300, and said second valve 300 acts as a regulation valve and regulates the amount of gas that flows towards the gas outlet 11.

The invention claimed is:

1. A gas valve comprising
   a valve body having a gas enclosure with a gas inlet, a gas outlet and a passage opening situated between the gas inlet and the gas outlet;
   a valve member comprising a valve seat that is moveable in relation to the passage opening to regulate a gas flow between the gas inlet and the gas outlet;
   an electrical actuator assembly disposed within the gas enclosure, the electrical actuator assembly operatively connected to the valve member and adapted to impart movement to the valve member to regulate the flow of gas between the gas inlet and the gas outlet;
   a printed circuit board situated adjacent an exterior of the valve body and electrically coupled to the electrical actuator assembly by at least one electrical connector, the printed circuit board having one or more electrical traces that couple the at least one electrical connector to a connection area of the printed circuit board, the connection area being accessible from an exterior of the valve body; and
   an elastic sealing member situated between the printed circuit board and the gas enclosure, the elastic sealing member having a first surface facing toward the gas enclosure and an opposite second surface facing toward a first surface of the printed circuit board, the first surface of the printed circuit board pressing against the second surface of the elastic sealing member to form a gas-tight seal between the gas enclosure and the exterior of the valve body.

2. A gas valve according to claim 1, wherein the elastic sealing member comprises at least one hole and the printed circuit board comprises at least one respective hole, the at least one electrical connector extending through the at least one hole of the elastic sealing member and the at least one respective hole of the printed circuit board and being connected to a second surface of the printed circuit board opposite the first surface.

3. A gas valve according to claim 2, wherein at least a portion of the elastic sealing member extends through the at least one hole of the printed circuit board surrounding the at least one electrical connector.

4. A gas valve according to claim 1, wherein the connection area corresponds with an extension of the printed circuit board.

5. A gas valve according to claim 4, wherein a portion of the valve body at least partially covers the connection area.

6. A gas valve according to claim 4, wherein the valve body comprises a housing accessible from the exterior of the valve in the area of the connection area, the housing adapted to receive a connector to be connected to the connection area.

7. A gas valve according to claim 1, wherein the printed circuit board is made of a metal.

8. A gas valve according to claim 7, wherein the printed circuit board is made of aluminium.

9. A gas valve according to claim 1, further comprising a sensor disposed within the gas enclosure, the sensor electrically coupled to the connection area of the printed circuit board via one or more signal conduction paths running through the printed circuit board.

10. A gas valve according to claim 9, wherein the printed circuit board has a first signal conduction path for transmitting signals generated by the sensor to the connection area and a second signal conduction path for transmitting signals from the connection area to the sensor.

11. A gas valve according to claim 1, wherein the printed circuit board is electrically coupled to the electrical actuator assembly by first and second electrical connectors, the first electrical connector coupled to a first electrical trace of the printed circuit board that couples the first electrical connector to the connection area, the second electrical connector coupled to a second electrical trace of the printed circuit board that couples the first electrical connector to the connection area.

12. A gas valve comprising
a first valve body having a gas enclosure with a gas inlet, a gas outlet and a passage opening situated between the gas inlet and the gas outlet;
a second valve body having an air enclosure;
a valve member comprising a valve seat that is moveable in relation to the passage opening to regulate a gas flow between the gas inlet and the gas outlet;
an electrical actuator assembly disposed within the air enclosure, the electrical actuator assembly operatively connected to the valve member and adapted to impart movement to the valve member to regulate the flow of gas between the gas inlet and the gas outlet;
a printed circuit board situated between the gas enclosure and air enclosure and having a first surface facing toward the air enclosure and an opposite second surface facing toward the gas enclosure, the printed circuit board electrically coupled to the electrical actuator assembly by at least one electrical connector, the printed circuit board having one or more electrical traces situated on the first surface that couples the at least one electrical connector to a connection area of the printed circuit board, the connection area being accessible from an exterior of the gas valve; and
an elastic sealing member situated between the printed circuit board and the gas enclosure, the elastic sealing member having a first surface facing toward the gas enclosure and an opposite second surface facing toward the air enclosure, the second surface of the printed circuit board pressing against the second surface of the elastic sealing member to form a gas-tight seal between the gas enclosure and the air enclosure.

13. A gas valve according to claim 12, wherein the second body comprises a metal structure that is connected directly to a metal structure of the first body, the metal structure of the second body comprising a window through which the connection area of the printed circuit board extends.

14. A gas valve according to claim 12, wherein the second body comprises an inner recess along an inner perimeter that provides an inner wall that presses on the second surface of the printed circuit board.

15. A gas valve according to claim 12, wherein the connection area corresponds with an extension of the printed circuit board.

16. A gas valve according to claim 15, wherein a portion of the valve body at least partially covers the connection area.

17. A gas valve according to claim 15, wherein the valve body comprises a housing accessible from the exterior of the valve in the area of the connection area, the housing adapted to receive a connector to be connected to the connection area.

18. A gas valve according to claim 12, wherein the printed circuit board is made of a metal.

19. A gas valve according to claim 18, wherein the printed circuit board is made of aluminium.

* * * * *